(12) United States Patent
Gonion

(10) Patent No.: US 9,317,283 B2
(45) Date of Patent: *Apr. 19, 2016

(54) RUNNING SHIFT FOR DIVIDE INSTRUCTIONS FOR PROCESSING VECTORS

(71) Applicant: Apple Inc., Cupertino, CA (US)

(72) Inventor: Jeffry E. Gonion, Campbell, CA (US)

(73) Assignee: Apple Inc., Cupertino, CA (US)

( * ) Notice: Subject to any disclaimer, the term of this patent is extended or adjusted under 35 U.S.C. 154(b) by 680 days.

This patent is subject to a terminal disclaimer.

(21) Appl. No.: 13/717,480

(22) Filed: Dec. 17, 2012

(65) Prior Publication Data

US 2013/0111193 A1 May 2, 2013

Related U.S. Application Data

(63) Continuation-in-part of application No. 12/541,505, filed on Aug. 14, 2009, now Pat. No. 8,359,460, and a continuation-in-part of application No. 13/188,737, filed on Jul. 22, 2011, now Pat. No. 8,447,956, said application No. 13/188,737 is a continuation-in-part of application No. 12/541,546, filed on Aug. 14, 2009, now Pat. No. 8,359,461.

(60) Provisional application No. 61/089,251, filed on Aug. 15, 2008.

(51) Int. Cl.
G06F 9/315 (2006.01)
G06F 9/302 (2006.01)
G06F 9/30 (2006.01)
G06F 9/45 (2006.01)

(52) U.S. Cl.
CPC .......... *G06F 9/30032* (2013.01); *G06F 8/4441* (2013.01); *G06F 9/3001* (2013.01); *G06F 9/30036* (2013.01)

(58) Field of Classification Search
None
See application file for complete search history.

(56) References Cited

U.S. PATENT DOCUMENTS 5,381,536 A    1/1995  Phelps
5,481,746 A *  1/1996  Schiffleger .......... G06F 9/30032
                                                   708/209

(Continued)

OTHER PUBLICATIONS

Stack Overflow (java—Right Shift to Perform Divide by 2 on -1); 3 pages; 2010; accessed on Aug. 20, 2015 at "http://stackoverflow.com/questions/2143840/right-shift-to-perform-divide-by-2-on-1".*

(Continued)

*Primary Examiner* — Keith Vicary
(74) *Attorney, Agent, or Firm* — Meyertons, Hood, Kivlin, Kowert & Goetzel, P.C.; Lawrence J. Merkel

(57) ABSTRACT

A processor may generate a result vector when executing a RunningShiftForDivide1P or RunningShiftForDivide2P instruction. For example, upon executing a RunningShiftForDivide1P/2P instruction, the processor may receive a first input vector and a second input vector. The processor then may record a base value from an element at a key element position in the first input vector. Next, when generating the result vector, for each active element in the result vector to the right of the key element position, the processor may generate a shifted base value using shift values from the second input vector. The processor then may correct the shifted base value when a predetermined condition is met. Next, the processor may set the element of the result vector equal to the shifted base value.

24 Claims, 5 Drawing Sheets

(56) References Cited

U.S. PATENT DOCUMENTS

| | | |
|---|---|---|
| 5,781,752 A | 7/1998 | Moshovos |
| 5,953,241 A | 9/1999 | Hansen |
| 6,115,808 A | 9/2000 | Arora |
| 6,295,599 B1 | 9/2001 | Hansen |
| 6,308,250 B1 | 10/2001 | Klausler |
| 6,584,482 B1 | 6/2003 | Hansen |
| 6,643,765 B1 | 11/2003 | Hansen |
| 6,725,356 B2 | 4/2004 | Hansen |
| 7,213,131 B2 | 5/2007 | Hansen |
| 7,216,217 B2 | 5/2007 | Hansen |
| 7,260,708 B2 | 8/2007 | Hansen |
| 7,301,541 B2 | 11/2007 | Hansen |
| 7,353,367 B2 | 4/2008 | Hansen |
| 7,430,655 B2 | 9/2008 | Hansen |
| 7,464,252 B2 | 12/2008 | Hansen |
| 7,509,366 B2 | 3/2009 | Hansen |
| 7,516,308 B2 | 4/2009 | Hansen |
| 7,653,806 B2 | 1/2010 | Hansen |
| 7,660,972 B2 | 2/2010 | Hansen |
| 7,660,973 B2 | 2/2010 | Hansen |
| 7,730,287 B2 | 6/2010 | Hansen |
| 8,359,461 B2 * | 1/2013 | Gonion ............... G06F 8/4441 712/222 |
| 2008/0317150 A1 * | 12/2008 | Alexander .......... H04L 25/0204 375/260 |

OTHER PUBLICATIONS

Sheffler (A Portable MPI-Based Parallel Vector Template Library); Research Institute for Advanced Computer Science—NASA Ames Research Center; RIACS Technical Report 95.04, Feb. 1995; 32 pages.*

Young (NRL Connection Machine Fortran Library); Naval Research Laboratory; NRL Memorandum Report 6807; Apr. 16, 1991; 193 pages.*

* cited by examiner

US 9,317,283 B2

RUNNING SHIFT FOR DIVIDE INSTRUCTIONS FOR PROCESSING VECTORS

RELATED APPLICATIONS

This application is a continuation in part of, and hereby claims priority under 35 U.S.C. §120 to, U.S. patent application Ser. No. 12/541,505, filed 14 Aug. 2009, now U.S. Pat. No. 8,359,460. This application is also a continuation in part of, and hereby claims priority under 35 U.S.C. §120 to, U.S. patent application Ser. No. 13/188,737, filed 22 Jul. 2011, now U.S. Pat. No. 8,447,956. This application further claims priority under 35 U.S.C. §119 to U.S. provisional patent application No. 61/089,251, filed 15 Aug. 2008, to which the parent application Ser. Nos. 12/541,505 and 13/188,737 also claim priority. These applications are each herein incorporated by reference.

This application is related to: (1) application Ser. No. 12/419,629, filed on 7 Apr. 2009 and now U.S. Pat. No. 8,209,525; (2) application Ser. No. 12/419,644, filed on 7 Apr. 2009 and now U.S. Pat. No. 8,356,159; (3) application Ser. No. 12/419,661, filed on 7 Apr. 2009 and now U.S. Pat. No. 8,131,979; (4) application Ser. No. 12/495,656, filed on 30 Jun. 2009 and now U.S. Pat. No. 8,370,608; (5) application Ser. No. 12/495,643, filed on 30 Jun. 2009 and now U.S. Pat. No. 8,356,164; (6) application Ser. No. 12/495,631, filed on 30 Jun. 2009 and now U.S. Pat. No. 8,762,690; (7) application Ser. No. 12/541,526, filed on 14 Aug. 2009 and now U.S. Pat. No. 8,364,938; and (8) application Ser. No. 12/541,546, filed on 14 Aug. 2009 and now U.S. Pat. No. 8,359,461.

This application is also related to: (1) application Ser. No. 12/873,043, filed 31 Aug. 2010 and now U.S. Pat. No. 8,417,921; (2) application Ser. No. 12/873,063, filed 31 Aug. 2010 and now U.S. Pat. No. 8,271,832; (3) application Ser. No. 12/873,074, filed 31 Aug. 2010 and now abandoned; (4) application Ser. No. 12/907,471, filed 19 Oct. 2010 and now abandoned; (5) application Ser. No. 12/907,490, filed 19 Oct. 2010 and now U.S. Pat. No. 8,959,316; (6) application Ser. No. 12/977,333, filed 23 Dec. 2010 and now U.S. Pat. No. 8,650,383; (7) application Ser. No. 13/006,243, filed 13 Jan. 2011 and now U.S. Pat. No. 8,984,262; (8) application Ser. No. 13/189,140, filed 22 Jul. 2011 and now abandoned; (9) application Ser. No. 13/291,931, filed 8 Nov. 2011 and now U.S. Pat. No. 8,793,472; (10) application Ser. No. 13/343,619, filed on 4 Jan. 2012 and now U.S. Pat. No. 9,182,959; (11) application Ser. No. 13/414,606, filed on 7 Mar. 2012 and now U.S. Pat. No. 9,110,683; (12) application Ser. No. 13/456,371, filed on 26 Apr. 2012 and now U.S. Pat. No. 8,464,031; (13) application Ser. No. 13/463,454, filed on 3 May 2012 and now U.S. Pat. No. 8,484,443; (14) application Ser. No. 13/479,097, filed on 23 May 2012 and now U.S. Pat. No. 8,938,642; (15) application Ser. No. 13/484,666, filed on 31 May 2012, pending; (16) application Ser. No. 13/484,709, filed on 31 May 2012 and now U.S. Pat. No. 8,504,806; (17) application Ser. No. 13/552,447, filed on 18 Jul. 2012, pending; and (18) application Ser. No. 13/604,414, filed on 5 Sep. 2012 and now U.S. Pat. No. 9,009,528.

This application is also related to: (1) application Ser. No. 12/237,212, filed 24 Sep. 2008 and now U.S. Pat. No. 8,181,001; (2) application Ser. No. 12/237,196, filed 24 Sep. 2008 and now U.S. Pat. No. 8,176,299; (3) application Ser. No. 12/237,190, filed 24 Sep. 2008 and now U.S. Pat. No. 8,745,360; (4) application Ser. No. 11/803,576, filed 14 May 2007, and now U.S. Pat. No. 8,019,976; and (5) application Ser. No. 13/224,170, filed 14 May 2007 and now U.S. Pat. No. 8,402,255.

FIELD

The described embodiments relate to techniques for improving the performance of computer systems. More specifically, the described embodiments relate to a RunningShiftForDivide1P and RunningShiftForDivide2P instructions for processing vectors.

RELATED ART

Recent advances in processor design have led to the development of a number of different processor architectures. For example, processor designers have created superscalar processors that exploit instruction-level parallelism (ILP), multi-core processors that exploit thread-level parallelism (TLP), and vector processors that exploit data-level parallelism (DLP). Each of these processor architectures has unique advantages and disadvantages which have either encouraged or hampered the widespread adoption of the architecture. For example, because ILP processors can often operate on existing program code that has undergone only minor modifications, these processors have achieved widespread adoption. However, TLP and DLP processors typically require applications to be manually re-coded to gain the benefit of the parallelism that they offer, a process that requires extensive effort. Consequently, TLP and DLP processors have not gained widespread adoption for general-purpose applications.

One significant issue affecting the adoption of DLP processors is the vectorization of loops in program code. In a typical program, a large portion of execution time is spent in loops. Unfortunately, many of these loops have characteristics that render them unvectorizable in existing DLP processors. Thus, the performance benefits gained from attempting to vectorize program code can be limited.

One significant obstacle to vectorizing loops in program code in existing systems is dependencies between iterations of the loop. For example, loop-carried data dependencies and memory-address aliasing are two such dependencies. These dependencies can be identified by a compiler during the compiler's static analysis of program code, but they cannot be completely resolved until runtime data is available. Thus, because the compiler cannot conclusively determine that runtime dependencies will not be encountered, the compiler cannot vectorize the loop. Hence, because existing systems require that the compiler determine the extent of available parallelism during compilation, relatively little code can be vectorized.

SUMMARY

The described embodiments include a processor (e.g., processor 102 in FIG. 1) that generates a result vector when executing a RunningShiftForDivide1P instruction or a RunningShiftForDivide2P instruction. In these embodiments, upon executing a RunningShiftForDivide1P instruction Or a RunningShiftForDivide2P instruction, the processor receives a first input vector, a second input vector, a control vector, and a predicate vector, each of which includes N elements. The processor then records a base value from an element at a key element position in the first input vector. Next, the processor generates the result vector. When generating the result vector, for each active element in the result vector to the right of the key element position, the processor generates a shifted base value that is equal to the base value shifted by a number of bit positions equal to a sum of values in relevant elements of the second input vector from an element at the key element position to and including a predetermined element in the second input vector, wherein a relevant element is an element for which a corresponding element in the control vector is active. The processor then corrects the shifted base value by adding 1 to the shifted base value when a predetermined condition is met. Next, the processor sets the element of the result vector equal to the shifted base value.

In some embodiments, the predetermined condition is met when the base value is negative and any of N least-significant bits in the base value before shifting the base value are non-zero, where N is equal to the sum of values.

In some embodiments, the predetermined condition is met when the shifted base value does not match a result of dividing the base value by 2 raised to a power equal to the sum of values.

In some embodiments, e.g., for the RunningShiftForDivide1P instruction, the predetermined element in the second input vector is a closest element in the second input vector to the left of the element in the result vector. In some embodiments, e.g., for the RunningShiftForDivide2P instruction, the predetermined element in the second input vector is an element in the second input vector at a same position as the element in the result vector.

In some embodiments, the key element position is a first element position (e.g., the leftmost element position, where elements are numbered in increasing order from left to right) where both the control vector and the predicate vector are active.

In some embodiments, when generating the result vector, the processor sets the element in the result vector at the key element position equal to one of: (1) the base value or (2) a shifted base value that is computed by: (a) generating a shifted base value that is equal to the base value shifted by a number of bit positions equal to a sum of values in relevant elements of the second input vector from an element at the key element position to and including a predetermined element in the second input vector, wherein a relevant element is an element for which a corresponding element in the control vector is active and (b) correcting the shifted base value by adding 1 to the shifted base value when a predetermined condition is met (the predetermined condition is described above).

In some embodiments, for each active element in the result vector to the left of the key element position, when generating the result vector, the processor sets the element in the result vector equal to a value in a corresponding element in the first vector. In some embodiments, if no key element position exists, when generating the result vector, the processor sets each active element equal to a value in a corresponding element in the first vector.

In some embodiments, when generating the result vector, the processor leaves each inactive element in the result vector unmodified.

In some embodiments, the processor receives a scalar shift value. The processor then generates the second input vector by, for each active element in the second input vector to the right of the key element position, writing the scalar shift value in the element of the second input vector.

BRIEF DESCRIPTION OF THE FIGURES

In the figures, like reference numerals refer to the same figure elements.

DETAILED DESCRIPTION

Figure 1:
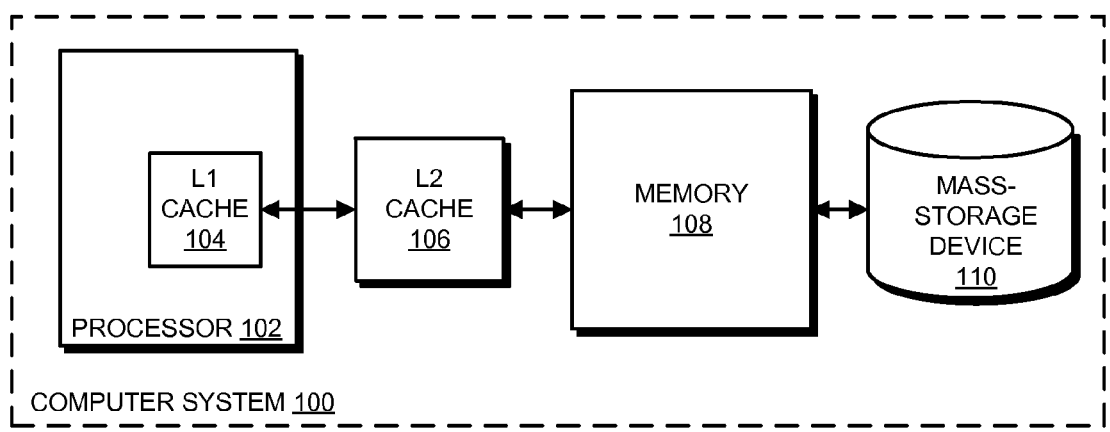
FIG. 1 presents a block diagram of a computer system in accordance with some embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

In the described embodiments, an electronic device with computing capabilities (e.g., computer system 100 in FIG. 1) can use code and/or data stored on a computer-readable storage medium to perform some or all of the operations herein described. More specifically, the electronic device can read the code and/or data from the computer-readable storage medium and can execute the code and/or use the data when performing the described operations. A computer-readable storage medium can be any device or medium that can store code and/or data for use by such an electronic device. For example, the computer-readable storage medium can include, but is not limited to, volatile memory or non-volatile memory, including flash memory, random access memory (RAM, SRAM, DRAM, RDRAM, DDR/DDR2/DDR3 SDRAM, etc.), read-only memory (ROM), magnetic or optical storage mediums (e.g., disk drives, magnetic tape, CDs, DVDs), or other computer-readable mediums capable of storing data structures or code. In the described embodiments, the computer-readable storage medium does not include non-statutory computer-readable storage mediums such as transitory signals.

In the described embodiments, one or more hardware modules can be configured to perform the operations herein described. For example, the hardware modules can comprise, but are not limited to, one or more processors/processor cores, application-specific integrated circuit (ASIC) chips, field-programmable gate arrays (FPGAs), and/or other programmable-logic devices. When the hardware modules are activated, the hardware modules can perform some or all of the described operations. In some embodiments, the hardware modules include one or more general-purpose circuits that are configured by executing instructions (program code, firmware, etc.) to perform the operations.

In the following, "some embodiments" describes a subset of all of the possible embodiments, but does not always specify the same subset of the embodiments.

Macroscalar Architecture

The embodiments described herein are based in part on the Macroscalar Architecture that is described in U.S. patent application Ser. No. 12/541,505, filed 14 Aug. 2009 and now U.S. Pat. No. 8,359,460, and U.S. patent application Ser. No. 13/188,737, filed 22 Jul. 2011 and now U.S. Pat. No. 8,447, 956, (hereinafter, "the '505 and '737 applications"), the contents of which are (as described above) incorporated by reference.

As recited in the '505 and '737 applications, the described embodiments provide an instruction set and supporting hardware that allow compilers to generate program code for loops without completely determining parallelism at compile-time, and without discarding useful static analysis information. Specifically, these embodiments provide a set of instructions that do not mandate parallelism for loops but instead enable parallelism to be exploited at runtime if dynamic conditions permit. These embodiments thus include instructions that enable code generated by the compiler to dynamically switch between non-parallel (scalar) and parallel (vector) execution for loop iterations depending on conditions at runtime by switching the amount of parallelism used.

These embodiments provide instructions that enable an undetermined amount of vector parallelism for loop iterations but do not require that the parallelism be used at runtime. More specifically, these embodiments include a set of vector-length agnostic instructions whose effective vector length can vary depending on runtime conditions. Thus, if runtime dependencies demand non-parallel execution of the code, then execution occurs with an effective vector length of one element. Likewise, if runtime conditions permit parallel execution, the same code executes in a vector-parallel manner to whatever degree is allowed by runtime dependencies (and the vector length of the underlying hardware). For example, if two out of eight elements of the vector can safely execute in parallel, the described embodiments execute the two elements in parallel. In these embodiments, expressing program code in a vector-length agnostic format enables a broad range of vectorization opportunities that are not present in existing systems.

In the described embodiments, during compilation, a compiler first analyzes the loop structure of a given loop in program code and performs static dependency analysis. The compiler then generates program code that retains static analysis information and instructs the processor (e.g., processor 102 in FIG. 1) how to resolve runtime dependencies and process the program code with the maximum amount of parallelism possible. More specifically, the compiler provides vector instructions for performing corresponding sets of loop iterations in parallel, and provides vector-control instructions for dynamically limiting the execution of the vector instructions to prevent data dependencies between the iterations of the loop from causing an error (which can be called "vector partitioning"). This approach defers the determination of parallelism to runtime, where the information on runtime dependencies is available, thereby allowing the software and processor to adapt parallelism to dynamically changing conditions (i.e., based on data that is not available at compile-time).

Vectorized program code can comprise vector-control instructions and vector instructions forming a loop in the vectorized program code that performs vector operations based on a corresponding loop in program code. The vector control instructions can determine iterations of the loop in program code that are safe to execute in parallel (because, e.g., no runtime data dependencies have occurred), and the vector instructions can be executed using predication and/or other dynamic controls to limit the elements of the vector instruction that are processed in parallel to the determined-safe iterations. (Recall that, in the described embodiments, each element of a vector instruction can perform an operation (or operations) for corresponding iterations of a loop in the program code.)

Terminology

Throughout the description, we use the following terminology. These terms may be generally known in the art, but are described below to clarify the subsequent descriptions.

The term "active" or "active element," as used in this description to refer to one or more elements of a vector, indicates elements that are operated on during a given operation. Generally, the described embodiments enable a vector execution unit to selectively perform operations on one or more available elements in a given vector in parallel. For example, an operation can be performed on only the first two of eight elements of the vector in parallel. In this case, the first two elements are "active elements," while the remaining six elements are "inactive elements." In the described embodiments, one or more other vectors can be used to determine which elements in a given operand vector are active (i.e., are to be operated on). For example, a "predicate vector" or "control vector" can include "active" elements that are used to determine which elements in the operand vector to perform operations on. In some embodiments, elements that contain data of a predetermined type are active elements (e.g., true, false, non-zero, zero, uppercase/lowercase characters, even/odd/prime numbers, vowels, whole numbers, etc.).

The terms "true" and "false" are used in this description to refer to data values (e.g., a data value contained in an element in a vector). Generally, in computer systems true and false are often represented by 1 and 0, respectively. In practice, a given embodiment could use any value to represent true and false, such as the number 55, or the letter "T."

In the following examples, "corresponding elements" may be described. Generally, corresponding elements are elements at a same element position in two or more different vectors. For example, when a value is copied from an element in an input vector into a "corresponding element" of a result vector, the value is copied from an nth element in the input vector into an nth element in the result vector.

In the following examples, "relevant" elements may be described. In the described embodiments, a relevant element is an element in a given vector for which the corresponding element in one or more other vectors (e.g., a control vector and/or predicate vector) is/are active. For example, given an input control vector for which only a fourth element is active, a second input vector only has one relevant element—the fourth element.

In this description, for clarity, operations performed for "vector instructions and/or operations" may be described generally as operations performed for "vector instructions," however, in the described embodiments "vector operations" can be handled in similar ways.

In this description, an element position (i.e., the location of a given element in one or more vectors) can be described as a "first" element position where a given condition is true (e.g., wherein an element of one or more vectors are active). Generally, a "first" element position is an element position with a lowest element number. For example, assuming that the elements in the input vector are numbered 0-N from left to right, the first element position where a condition occurs is the leftmost element position. In contrast, the first element is the rightmost element position when the elements are numbered 0-N from right to left. Additionally, a "last" element position is an element position with a highest element number.

Notation

In describing the embodiments in the instant application, we use the following formats for variables, which are vector quantities unless otherwise noted:

---
p5 = a < b;
---

Elements of vector p5 are set to 0 or 1 depending on the result of the comparison operation a<b. Note that vector p5 can be a predicate vector that can be used to control the number of elements of one or more vector instructions that execute in parallel.

---
~p5; a = b + c;
---

Only elements in vector a designated by active (i.e., non-zero) elements in the predicate vector p5 receive the result of b+c. The remaining elements of a are unchanged. This operation is called "predication," and is denoted using the tilde ("~") before the predicate vector.

---
!p5; a = b + c;
---

Only elements in vector a designated by active (e.g., non-zero) elements in the predicate vector p5 receive the result of b+c. The remaining elements of a are set to zero. This operation is called "zeroing," and is denoted using the exclamation point ("!") before the predicate vector.

---
if (FIRST( )) goto ...; Also LAST( ), ANY( ), ALL( ), CARRY( ), ABOVE( ), or NONE( ), (where ANY( ) == !NONE( ))
---

These instructions test the processor status flags and branch accordingly.

---
x += VECLEN;
---

VECLEN is a value that communicates the number of elements per vector. The value is determined at runtime by the processor 102 (see FIG. 1), rather than being determined by the compiler/assembler.

---
// Comment
---

In a similar way to many common programming languages, the examples presented below use the double forward slash to indicate comments. These comments can provide information regarding the values contained in the indicated vector or explanation of operations being performed in a corresponding example.

In these examples, other C++-formatted operators retain their conventional meanings, but are applied across the vector on an element-by-element basis. Where function calls are employed, they imply a single instruction that places any value returned into a destination register. For simplicity in understanding, all vectors discussed herein are vectors of integers, but alternative embodiments support other data formats.

Instruction Definitions

The described embodiments comprise the RunningShiftForDivide1P and RunningShiftForDivide2P instructions (collectively, the "RunningShiftForDivide1P/2P instructions"). Generally, the RunningShiftForDivide1P/2P instructions generate a result vector with results from a running divide operation on a base value, where the running divide is performed using shift operations, and a correction is made when the shifted base value does not match a result of performing a corresponding division of the base value.

Given a first source vector, a second source vector, a predicate vector, and a control vector as inputs, each vector comprising a plurality of elements (e.g., 7, 86, or another number), the RunningShiftForDivide1P/2P instructions capture a base value from a key element in the first input vector. In some embodiments, the key element is in a first element position where both a corresponding element of the predicate vector and the control vector are active (e.g., a leftmost element position when elements are numbered in ascending order from left to right). The RunningShiftForDivide1P/2P instructions then generate a result vector. When generating the result vector, for each element of the result vector to the right of a key element position for which a corresponding element of the predicate vector is active, the RunningShiftForDivide1P/2P instructions generate a shifted base value that is equal to shifting the base value a number of bit positions equal to a sum of values in relevant elements of the second input vector from an element at the key element position to and including a predetermined element in the second input vector (relevant elements are elements for which a corresponding element of the control vector is active, and the predetermined element, which differs for the 1P and 2P variants of the RunningShiftForDivide1P/2P instructions, is described in more detail below). The RunningShiftForDivide1P/2P instructions then correct the shifted base value when a predetermined condition occurs by adding 1 to the shifted base value. Next, the RunningShiftForDivide1P/2P instructions write the shifted (and possibly corrected) base value into the element of the result vector. The RunningShiftForDivide1P instruction also sets the element in the key element position in the result vector equal to the base value and sets elements to the left of the key element position equal to corresponding elements of the first input vector. The RunningShiftForDivide2P instruction also sets the element in the key element position in the result vector equal to a shifted (and possibly corrected) base value and sets elements to the left of the key element position equal to corresponding elements of the first input vector.

In some embodiments, the above-described predetermined condition occurs when the shifted base value does not match a result of dividing the base value by 2 raised to a power equal to the sum of values. For example, in embodiments where right-shifting a negative −1 causes a 1 to be shifted into the leftmost element, again resulting in −1, using the shift to perform the divide of negative numbers can generate a result that differs from the corresponding division (depending on the relative size of the negative number and the size of the shift). In some embodiments, the predetermined condition can be detected when the base value is negative and any of N least-significant bits in the base value before shifting the base value are non-zero, where N is equal to the above-described sum of values.

Although certain arrangements of instructions are used in describing the RunningShiftForDivide1P and RunningShiftForDivide2P instructions, a person of skill in the art will recognize that these concepts may be implemented using different arrangements or types of instructions without departing from the spirit of the described embodiments. Additionally, the RunningShiftForDivide1P and RunningShiftForDivide2P instructions are described using a signed-integer data type. However, in alternative embodiments, other data types or formats are used.

For the purposes of explanation, the vector data type is defined as a C++ class containing an array v[ ] of elements that comprise the vector. Within these descriptions, the variable VECLEN indicates the size of the vector. In some embodiments, VECLEN is constant.

Note that the format of the following instruction definitions is a statement of the instruction type followed by a description of the instruction that can include example code as well as one or more usage examples.

RunningShiftForDivide1P

The RunningShiftForDivide1P instruction generates a result vector with elements set to a result of performing signed division by powers of 2 using a shift operation on a base value (which is captured from a key element position of a first input vector), for which the number of bit positions by which the base value is shifted for each element of the result vector are acquired from relevant elements of a second input vector. Viewed in another way, a result vector element in a given element position to the right of the key element position is equal to a first value. The active element in the nearest element position of the first input vector that is to the left of the given element position is shifted by a number of bits indicated in the nearest element position of the second input vector to generate the first value. The RunningShiftForDivide1P instruction performs a correction by setting elements of the result vector equal to zero where a shift by any non-zero amount is attempted that shifts the base value beyond −1. The RunningShiftForDivide1P instruction also sets the elements of the result vector at the key element position equal to the base value and sets elements to the left of the key element position equal to values from corresponding elements of the first input vector. For the RunningShiftForDivide1P instruction, a given element of the result vector that is in a given element position to the right of the key element position is set equal to the element value before the shift (and possible correction) corresponding to the given element position is performed.

Example

| r = RunningShiftForDivide1P(src1, src2, ctrl, gp) | | | | | | | | | | |
|---|---|---|---|---|---|---|---|---|---|---|
| On Entry: | gp | = { | 0 | 1 | 1 | 1 | 1 | 1 | 1 | } |
| | ctrl | = { | 0 | 0 | 1 | 1 | 1 | 1 | 0 | } |
| | src1 | = { | 7 | 3 | −8 | 9 | 8 | 5 | 8 | 9 | } |
| | src2 | = { | 2 | 1 | 1 | 1 | 1 | 1 | 2 | 1 | } |
| On Exit: | r | = { | 0 | 3 | −8 | −4 | −2 | −1 | 0 | 0 | } |

RunningShiftForDivide2P

The RunningShiftForDivide2P instruction generates a result vector with elements set to a result of performing signed division by powers of 2 using a shift operation on a base value (which is captured from a key element position of a first input vector), for which the number of bit positions by which the base value is shifted for each element of the result vector are acquired from relevant elements of a second input vector. Viewed in another way, a result vector element in a given element position to the right of the key element position is equal to a first value. The active element in the nearest element position of the first input vector that is to the left of the given element position is shifted by a number of bits indicated in the given element position of the second input vector to generate the first value. The RunningShiftForDivide2P instruction performs a correction by setting elements of the result vector equal to zero where a shift by any non-zero amount is attempted that shifts the base value beyond −1. The RunningShiftForDivide2P instruction also sets the elements of the result vector at the key element position equal to the shifted and possibly corrected (in the same manner as described above) base value and sets elements to the left of the key element position equal to values from corresponding elements of the first input vector. For the RunningShiftForDivide2P instruction, a given element of the result vector that is in a given element position to the right of the key element position is set equal to the element value after the shift and possible correction corresponding to the given element position is performed.

```
vector RunningShiftForDivide1P(vector src1, vector
src2, vector ctrl, vector gp)
{
    vector r;
    int s = 0, x;
    for (x=0; x<VECLEN; ++x)
        if (gp.v[x] && ctrl.v[x])
        {
            s = src1.v[x];
            break;
        }
        else if (gp.v[x])
        {
            r.v[x] = src1.v[x];
        }
    for (; x<VECLEN; ++x)
    {
        if (gp.v[x]) r.v[x] = s;
        if (gp.v[x] && ctrl.v[x]) s = (s >>
src2[x]) + ((s & (s >> 31) & ((1 << src2[x])−1))
!= 0);
    }
    return(r);
}
```

```
vector RunningShiftForDivide2P(vector src1, vector
src2, vector ctrl, vector gp)
{
    vector r;
    int s = 0, x;
    for (x=0; x<VECLEN; ++x)
        if (gp.v[x] && ctrl.v[x])
        {
            s = src1.v[x];
            break;
        }
        else if (gp.v[x])
        {
            r.v[x] = src1.v[x];
        }
    for (; x<VECLEN; ++x)
    {
        if (gp.v[x] && ctrl.v[x]) s = (s >>
src2[x]) + ((s & (s >> 31) & ((1 << src2[x])−1))
!= 0);
        if (gp.v[x]) r.v[x] = s;
    }
    return(r);
}
```

Example

```
r = RunningShiftForDivide2P(src1, src2, ctrl, gp)
On Entry:  gp    = { 0  1   1   1   1  1  1  1 }
           ctrl  = { 0  0   1   1   1  1  1  0 }
           src1  = { 7  3  -8   9   8  5  8  9 }
           src2  = { 2  1   1   1   1  1  2  1 }
On Exit:   r     = { 0  3  -4  -2  -1  0  0  0 }
```

Computer System

FIG. 1 presents a block diagram of a computer system 100 in accordance with some embodiments. Computer system 100 includes processor 102, L2 cache 106, memory 108, and mass-storage device 110. Processor 102 includes L1 cache 104.

Processor 102 can be a general-purpose processor that performs computational operations. For example, processor 102 can be a central processing unit (CPU) such as a microprocessor, a controller, an application-specific integrated circuit (ASIC), or a field-programmable gate array (FPGA). In the described embodiments, processor 102 has one or more mechanisms for vector processing (i.e., vector execution units).

Mass-storage device 110, memory 108, L2 cache 106, and L1 cache 104 are computer-readable storage devices that collectively form a memory hierarchy that stores data and instructions for processor 102. Generally, mass-storage device 110 is a high-capacity, non-volatile memory, such as a disk drive or a large flash memory, with a large access time, while L1 cache 104, L2 cache 106, and memory 108 are smaller, faster semiconductor memories that store copies of frequently used data. Memory 108 is typically a dynamic random access memory (DRAM) structure that is larger than L1 cache 104 and L2 cache 106, whereas L1 cache 104 and L2 cache 106 are typically comprised of smaller static random access memories (SRAM). In some embodiments, L2 cache 106, memory 108, and mass-storage device 110 are shared between one or more processors in computer system 100. Such memory structures are well-known in the art and are therefore not described in more detail.

In some embodiments, the devices in the memory hierarchy (i.e., L1 cache 104, etc.) can access (i.e., read and/or write) multiple cache lines per cycle. These embodiments enable more effective processing of memory accesses that occur based on a vector of pointers or array indices to non-contiguous memory addresses. In addition, in some embodiments, the caches in the memory hierarchy are divided into a number of separate banks, each of which can be accessed in parallel. Banks within caches and parallel accesses of the banks are known in the art and hence are not described in more detail.

Computer system 100 can be incorporated into many different types of electronic devices. For example, computer system 100 can be incorporated in or can be a desktop computer, a laptop computer, a tablet computer, a server, a media player, an appliance, a cellular phone, a piece of testing equipment, a network appliance, a personal digital assistant (PDA), a hybrid device (e.g., a "smart phone"), or another electronic device.

Although we use specific components to describe computer system 100, in alternative embodiments, different components may be present in computer system 100. For example, computer system 100 may not include some of the memory hierarchy (e.g., memory 108 and/or mass-storage device 110). Alternatively, computer system 100 may include video cards, video-capture devices, user-interface devices, network cards, optical drives, and/or other peripheral devices that are coupled to processor 102 using a bus, a network, or another suitable communication channel. Computer system 100 may also include one or more additional processors, wherein the processors share some or all of L2 cache 106, memory 108, and mass-storage device 110.

Processor

Figure 2:
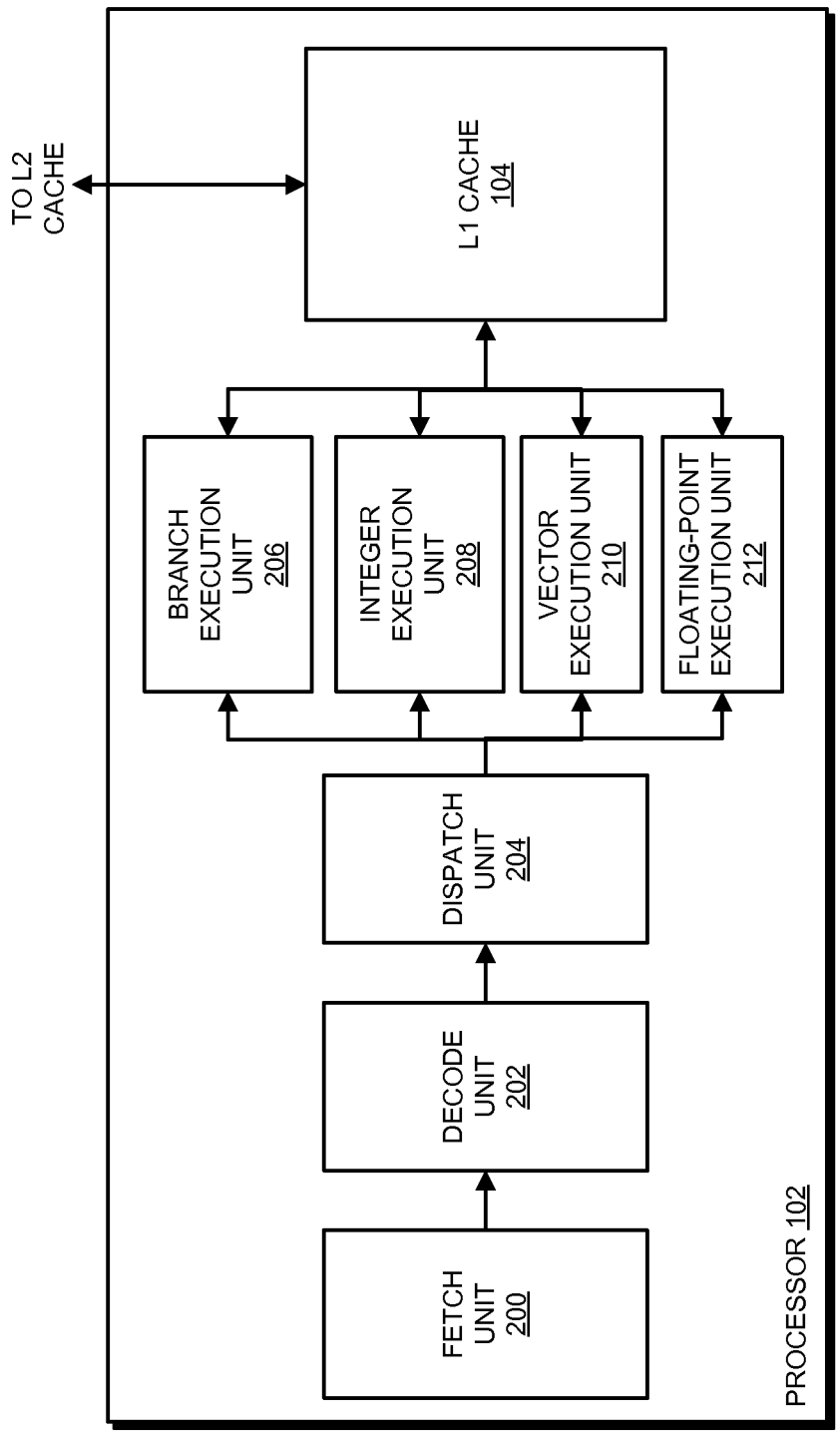
FIG. 2 presents an expanded view of a processor in accordance with some embodiments.

FIG. 2 presents an expanded view of processor 102 in accordance with some embodiments. As shown in FIG. 2, processor 102 includes L1 cache 104, fetch unit 200, decode unit 202, dispatch unit 204, branch execution unit 206, integer execution unit 208, vector execution unit 210, floating-point execution unit 212 (branch execution unit 206, integer execution unit 208, vector execution unit 210, and floating-point execution unit 212 as a group are interchangeably referred to as "the execution units").

Fetch unit 200 fetches instructions from the memory hierarchy in computer system 100 and forwards the fetched instructions to be decoded in decode unit 202 for eventual execution in the execution units. Generally, fetch unit 200 attempts to fetch instructions from the closest portion of the memory hierarchy first, and if the instruction is not found at that level of the memory hierarchy, proceeds to the next level in the memory hierarchy until the instruction is found. For example, in some embodiments, fetch unit can request instructions from L1 cache 104 (which can comprise a single physical cache for instructions and data, or can comprise physically separate instruction and data caches). Aside from the operations herein described, the operations of fetch units are generally known in the art and hence are not described in more detail.

Decode unit 202 decodes the instructions and assembles executable instructions to be sent to the execution units, and dispatch unit 204 receives decoded instructions from decode unit 202 and dispatches the decoded instructions to the appropriate execution unit. For example, dispatch unit 204 can dispatch branch instructions to branch execution unit 206, integer instructions to integer execution unit 208, etc.

Each of execution units 206-212 is used for performing computational operations, such as logical operations, mathematical operations, or bitwise operations for an associated type of operand or operation. More specifically, integer execution unit 208 is used for performing computational operations that involve integer operands, floating-point execution unit 212 is used for performing computational operations that involve floating-point operands, vector execution unit 210 is used for performing computational operations that involve vector operands, and branch execution unit 206 is used for performing operations for resolving branches. Integer execution units, branch execution units, and floating-point execution units are generally known in the art and are not described in detail.

Figure 3:
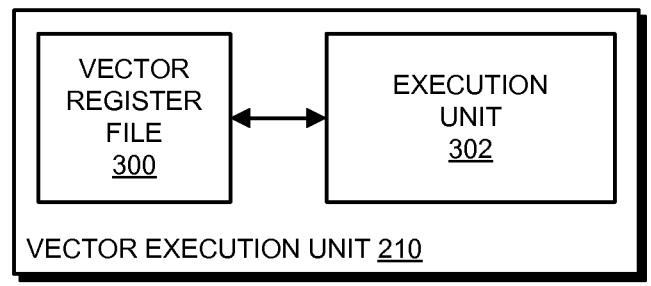
FIG. 3 presents an expanded view of a vector execution unit in accordance with some embodiments.

In the described embodiments, vector execution unit 210 is a single-instruction-multiple-data (SIMD) execution unit that performs operations in parallel on some or all of the data elements that are included in vectors of operands. FIG. 3 presents an expanded view of vector execution unit 210 in accordance with some embodiments. As is shown in FIG. 3, vector execution unit 210 includes a vector register file 300 and an execution unit 302. Vector register file 300 includes a set of vector registers that can hold operand vectors and result vectors for execution unit 302. In some embodiments, there are 32 vector registers in the vector register file, and each register includes 128 bits. In alternative embodiments, there are different numbers of vector registers and/or different numbers of bits per register.

Vector execution unit 302 retrieves operands from registers in vector register file 300 and executes vector instructions that cause execution unit 302 to perform operations in parallel on some or all of the data elements (or, simply, "elements") in the operand vector. For example, execution unit 302 can perform logical operations, mathematical operations, or bitwise operations on the elements in the vector. Execution unit 302 can perform one vector operation per cycle (although the "cycle" may include more than one cycle of a clock used to trigger, synchronize, and/or control execution unit 302's computational operations).

In the described embodiments, execution unit 302 supports vectors that hold N data elements (e.g., bytes, words, double-words, etc.). In these embodiments, execution unit 302 can perform operations on N or fewer of the data elements in an operand vector in parallel. For example, assuming an embodiment where the vector is 256 bits in length (i.e., 32 bytes), the data elements being operated on are four-byte words, and the operation is adding a value to the data elements, these embodiments can add the value to any number of the eight words in the vector.

In the described embodiments, execution unit 302 includes at least one control signal that enables the dynamic limitation of the data elements in an operand vector on which execution unit 302 operates. Specifically, depending on the state of the control signal, execution unit 302 may or may not operate on all the data elements in the vector. For example, assuming an embodiment where the vector is 512 bits in length and the data elements being operated on are four-byte words, the control signal can be asserted to prevent operations from being performed on some or all of 16 data words in the operand vector. Note that "dynamically" limiting the data elements in the operand vector upon which operations are performed can involve asserting the control signal separately for each cycle at runtime.

In some embodiments, based on the values contained in a vector of predicates or one or more scalar predicates, execution unit 302 applies vector operations to selected vector data elements only. In some embodiments, the remaining data elements in a result vector remain unaffected (which we call "predication") or are forced to zero (which we call "zeroing"). In some of these embodiments, the clocks for the data element processing subsystems ("lanes") that are unused due to predication or zeroing in execution unit 302 can be gated, thereby reducing dynamic power consumption in execution unit 302.

The described embodiments are vector-length agnostic. Thus, a compiler or programmer need not have explicit knowledge of the vector length supported by the underlying hardware (e.g., vector execution unit 302). In these embodiments, a compiler generates or a programmer writes program code that need not rely on (or use) a specific vector length (some embodiments are forbidden from even specifying a specific vector size in program code). Thus, the compiled code in these embodiments (i.e., binary code) runs on other embodiments with differing vector lengths, while potentially realizing performance gains from processors that support longer vectors. Consequently, as process technology allows longer vectors, execution of legacy binary code simply speeds up without any effort by software developers.

In some embodiments, vector lengths need not be powers of two. Specifically, vectors of 3, 7, or another number of data elements can be used in the same way as vectors with power-of-two numbers of data elements.

In the described embodiments, each data element in the vector can contain an address that is used by execution unit 302 for performing a set of memory accesses in parallel. In these embodiments, if one or more elements of the vector contain invalid memory addresses, invalid memory-read operations can occur. In these embodiments, invalid memory-read operations that would otherwise result in program termination instead cause any elements with valid addresses to be read and elements with invalid elements to be flagged, allowing program execution to continue in the face of speculative, and in hindsight illegal, read operations.

In some embodiments, processor 102 (and hence execution unit 302) is able to operate on and use vectors of pointers. In these embodiments, the number of data elements per vector is the same as the number of pointers per vector, regardless of the size of the data type. Instructions that operate on memory may have variants that indicate the size of the memory access, but elements in processor registers should be the same as the pointer size. In these embodiments, processors that support both 32-bit and 64-bit addressing modes may choose to allow twice as many elements per vector in 32-bit mode, thereby achieving greater throughput. This implies a distinct throughput advantage to 32-bit addressing, assuming the same width data path. Implementation-specific techniques can be used to relax the requirement. For example, double-precision floating-point numbers can be supported in 32-bit mode through register pairing or some other specialized mechanism.

Although we describe processor 102 as including a particular set of units, in alternative embodiments, processor 102 can include different numbers or types of units. In addition, although vector execution unit 210 is describe using particular mechanisms, alternative embodiments may include different mechanisms. Generally, vector execution unit 210 (and, more broadly, processor 102) comprises sufficient mechanisms to perform vector operations, including the operations herein described.

Executing the RunningShiftForDivide1P/2P Instructions

Figure 4:
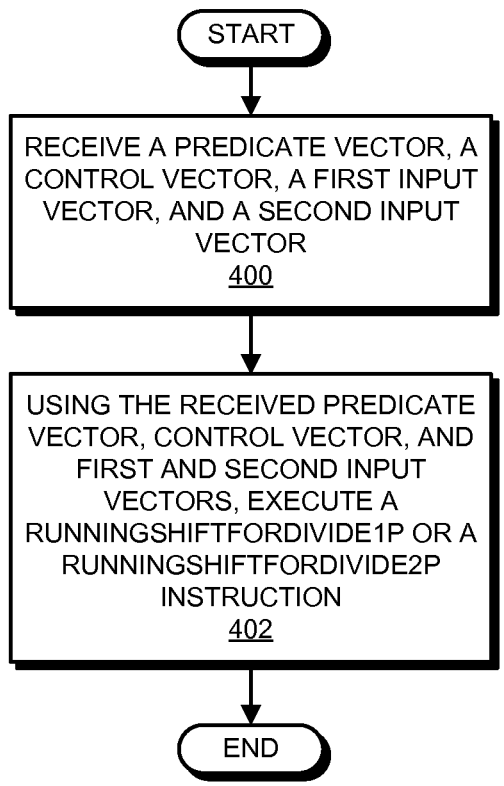
FIG. 4 presents a flowchart illustrating a process for executing program code in accordance with some embodiments.

FIG. 4 presents a flowchart illustrating a process for executing program code in accordance with some embodiments. As can be seen in FIG. 4, when executing program code, processor 102 receives a predicate vector, a control vector, a first input vector, and a second input vector that each include N elements, where N=15, 32, or another number (step 400). Next, using the received predicate vector, control vector, and the first and second input vectors, processor 102 executes a RunningShiftForDivide1P or a RunningShiftForDivide2P instruction (step 402). The following subsections describe the execution of the RunningShiftForDivide1P and RunningShiftForDivide2P instructions separately.

RunningShiftForDivide1P

Figure 5:
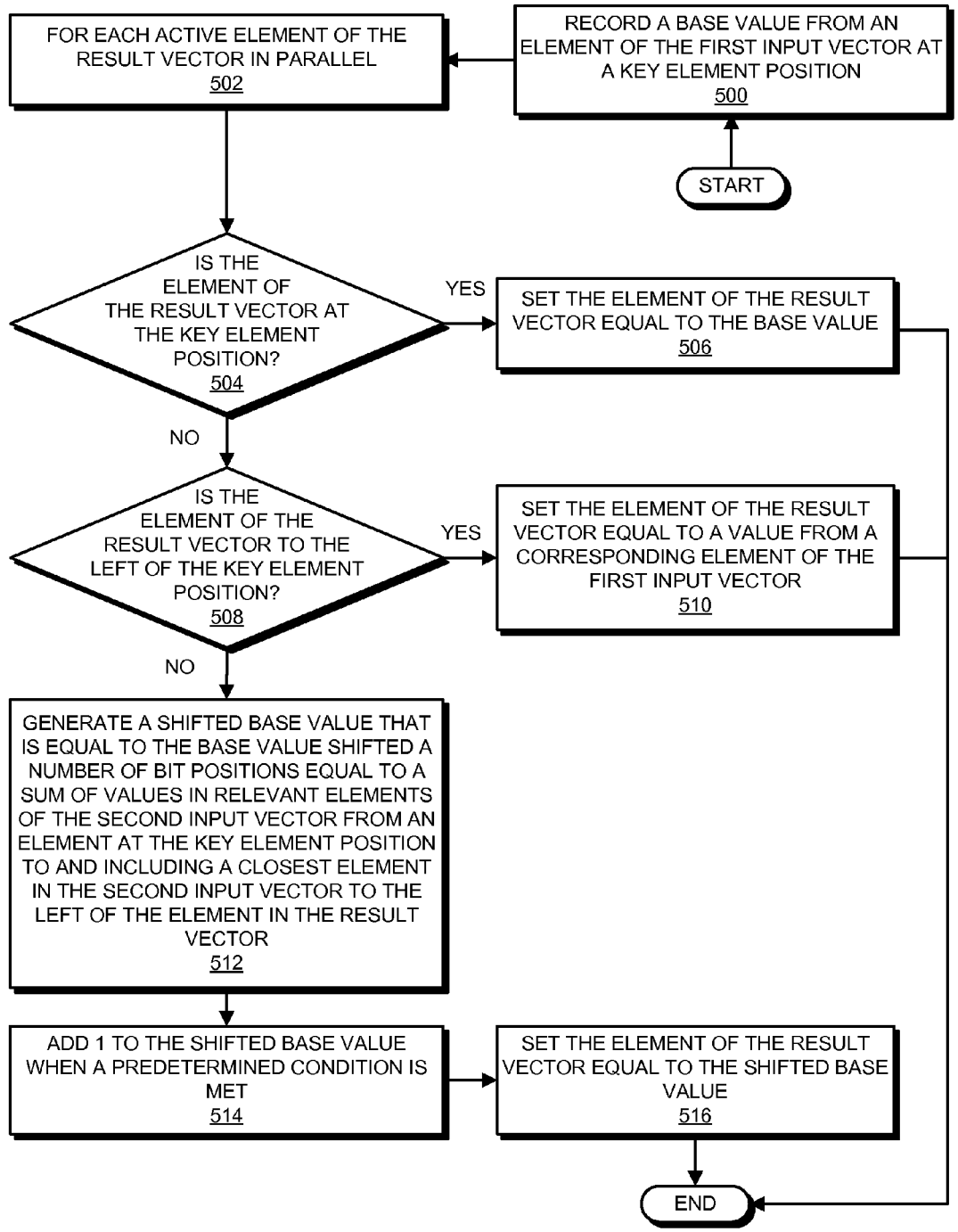
FIG. 5 presents a flowchart illustrating a process for executing a RunningShiftForDivide1P instruction in accordance with some embodiments.

FIG. 5 presents a flowchart illustrating a process for executing a RunningShiftForDivide1P instruction in accordance with some embodiments. In these embodiments, the operations shown in FIG. 5 are performed as part of step 402 in FIG. 4. Thus, for the purposes of describing the operations shown in FIG. 5, the predicate vector, the control vector, and the first and second input vectors are assumed to have been received, as shown in step 400 in FIG. 4.

As shown in FIG. 5, when executing the RunningShiftForDivide1P instruction, processor 102 first records a base value from an element of the first input vector at a key element position (step 500). In some embodiments, the key element position is the leftmost element position where the predicate vector and the control vector are both active (e.g., contain a non-zero value). For example, assuming a predicate vector pred, a control vector cv, and a first input vector a contain the values shown, the key element position is located at the third element, and the base value is recorded as −8:

```
a        = {  7   3  -8   9   8   5   8   9  }
pred     = {  0   1   1   1   1   1   1   1  }
cv       = {  0   0   1   1   1   1   0   0  }
base value = -8
```

Note that the key element position does not indicate any element in a particular vector, but instead indicates a location of an element that can apply to any of the vectors. Thus, in this description, "the key element" of different vectors may be referred to, and indicates an element at the key element position of that vector. Additionally, in alternative embodiments, the key element position is at a different location and, as described below, a key element position may not exist in the given vectors.

Processor 102 then processes each of the active elements of the result vector in parallel as follows (step 502). Specifically, for each of the elements in the result vector for which corresponding elements of the predicate vector pred are active in parallel, processor 102 makes the determinations in steps 504 and/or 508, and sets the element of the result vector in accordance with the appropriate step(s) 506, 510, or 512-516. Note that inactive elements of the result vector are left unchanged (predication).

Processor 102 determines if the element in the result vector is at the key element position in the result vector (step 504). If so, processor 102 sets the element in the result vector equal to the base value (step 506). For example, assuming a, pred, and cv contain the values shown, the result vector, res, could be generated as follows:

```
a     = {  7   3  -8   9   8   5   8   9  }
pred  = {  0   1   1   1   1   1   1   1  }
cv    = {  0   0   1   1   1   1   0   0  }
res   = {  X   X  -8   X   X   X   X   X  }
```

This example shows an exemplary element in the key element position for which the base value from a has been copied to res. For clarity, other elements in res are marked with X. Note that a key element position may not exist (i.e., there may be no element position where both pred and cv contain non-zero values). In this case, each active element in the result vector is set equal to the corresponding element in the first input vector, as is described below with respect to steps 508-510.

If the element in the result vector is not at the key element position, processor 102 determines if the element in the result vector is located to the left of the key element position in the result vector (step 508). If so, processor 102 sets the element in the result vector equal to a value from a corresponding element in the first input vector (step 510). For example, assuming a, pred, and cv contain the values shown, res could be generated as follows:

```
a     = {  7   3  -8   9   8   5   8   9  }
pred  = {  0   1   1   1   1   1   1   1  }
cv    = {  0   0   1   1   1   1   0   0  }
res   = {  X   3   X   X   X   X   X   X  }
```

This example shows active elements to the left of the key element position for which a value from the first input vector a has been copied to res. For clarity, other elements in res are marked with an X. As described above, there may be no element position where both pred and cv contain non-zero values, and hence no key element position. If this case occurs, values from a are copied to each corresponding active element in res.

If the element in the result vector is not located to the left of the key element position (step 508) (and hence is located to the right of the key element position), processor 102 generates a shifted base value that is equal to the base value shifted by a number of bit positions equal to a sum of the values in relevant elements of the second input vector from an element at the key element position to and including a closest element in the second input vector to the left of the element in the result vector (step 512). In some embodiments, a relevant element is an active element in the second input vector for which a corresponding element in the control vector is active. Processor 102 then adds 1 to the shifted base value when a predetermined condition is met (step 514). As described above, in some embodiments, the predetermined condition is met when the shifted base value does not match a result of dividing the base value by 2 raised to a power equal to the sum of values. In some embodiments, the predetermined condition can be detected when the base value is negative and any of N least-significant bits in the base value before shifting the base value are non-zero, where N is equal to the above-described sum of values. Processor 102 then sets the element of the result vector equal to the shifted base value (step 516). For example, assuming a, b, pred, and cv contain the values shown, res could be generated as follows:

```
a     = {  7   3  -8   9   8   5   8   9  }
pred  = {  0   1   1   1   1   1   1   1  }
cv    = {  0   0   1   1   1   1   0   0  }
b     = {  2   1   1   1   1   1   2   1  }
res   = {  X   X   X  -4  -2  -1   0   0  }
```

As this example shows, the active elements in res to the right of the key element position are the fourth through the eighth elements. For the fourth element in res, there is one relevant element in the second input vector from an element at the key element position to and including an element to the left of the fourth element in the second input vector (i.e., the key element in the second input vector itself), and the sum of the values in the relevant element is 1. Processor 102 therefore generates a shifted base value of −4, which is −8 right-shifted 1 bit position. Because the predetermined condition is not met (e.g., −4 is equal to −8 divided by 2), 1 is not added to the shifted base value, and the shifted base value is written to the fourth element of the result vector.

For the seventh element of res, there are four relevant elements in the second input vector from an element at the key element position to and including an element to the left of the seventh element in the second input vector and the sum of the values in the relevant elements is 4. Processor 102 therefore generates a shifted base value of −1, which is −8 right-shifted four bit positions. However, because the predetermined condition is met (−1 is not equal to −8 divided by 16), 1 is added to the shifted base value, which causes the shifted base value to be equal to 0. The shifted (and corrected) base value of 0 is then written to the seventh element of the result vector. By correcting the shifted base value in this way, processor 102 avoids incorrectly computing the division using a shift operation where 1s are shifted into the negative number.

RunningShiftForDivide2P

Figure 6:
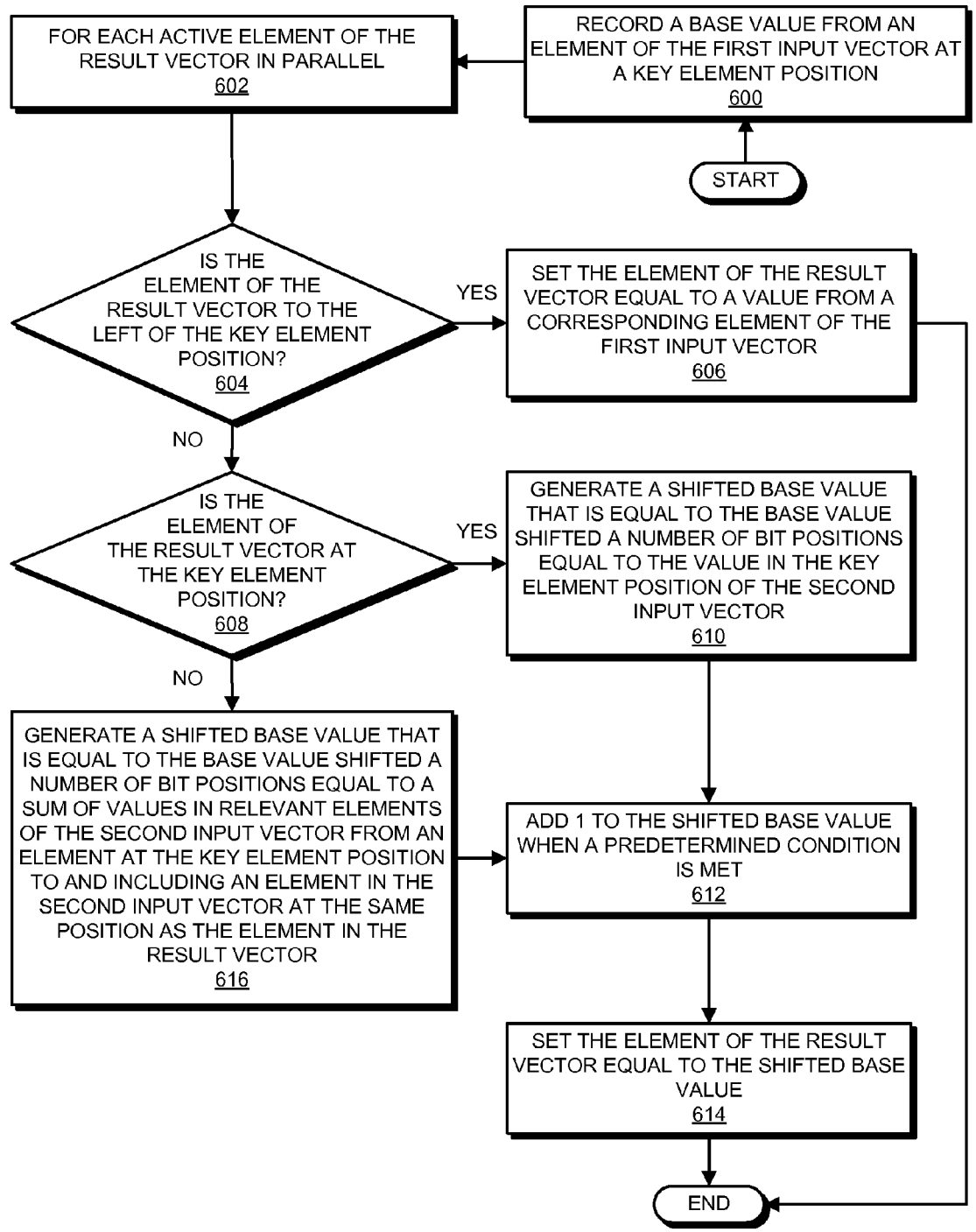
FIG. 6 presents a flowchart illustrating a process for executing a RunningShiftForDivide2P instruction in accordance with some embodiments.

FIG. 6 presents a flowchart illustrating a process for executing a RunningShiftForDivide2P instruction in accordance with some embodiments. In these embodiments, the operations shown in FIG. 6 are performed as part of step 402 in FIG. 4. Thus, for the purposes of describing the operations shown in FIG. 6, the predicate vector, the control vector, and the first and second input vectors are assumed to have been received, as shown in step 400 in FIG. 4.

As shown in FIG. 6, when executing the RunningShiftForDivide2P instruction, processor 102 first records a base value from an element of the first input vector at a key element position (step 600). In some embodiments, the key element position is the leftmost element position where the predicate vector and the control vector are both active (e.g., contain a non-zero value). For example, assuming a predicate vector pred, a control vector cv, and a first input vector a contain the values shown, the key element position is located at the third element, and the base value is recorded as −8:

```
a          = { 7  3  -8  9  8  5  8  9 }
pred       = { 0  1   1  1  1  1  1  1 }
cv         = { 0  0   1  1  1  1  0  0 }
base value = -8
```

As described above, the key element position does not indicate any element in a particular vector, but instead indicates a location of an element that can apply to any of the vectors. Thus, in this description, "the key element" of different vectors may be referred to, and indicates an element at the key element position of that vector. Additionally, in alternative embodiments, the key element position is at a different location and, as described below, a key element position may not exist in the given vectors.

Processor 102 then processes each of the active elements of the result vector in parallel as follows (step 602). Specifically, for each of the elements in the result vector for which corresponding elements of the predicate vector pred are active in parallel, processor 102 makes the determinations in steps 604 and/or 608, and sets the element of the result vector in accordance with the appropriate step(s) 606, 610-614, or 616 and 612-614. Note that inactive elements of the result vector are left unchanged (predication).

Processor 102 determines if the element in the result vector is located to the left of the key element position in the result vector (step 604). If so, processor 102 sets the element in the result vector equal to a value from a corresponding element in the first input vector (step 606). For example, assuming a, pred, and cv contain the values shown, res could be generated as follows:

```
a    = { 7  3  -8  9  8  5  8  9 }
pred = { 0  1   1  1  1  1  1  1 }
cv   = { 0  0   1  1  1  1  0  0 }
res  = { X  3   X  X  X  X  X  X }
```

This example shows active elements to the left of the key element position for which a value from the first input vector a has been copied to res. For clarity, other elements in res are marked with an X. In some cases, there may be no element position where both pred and cv contain non-zero values, and hence no key element position. If this case occurs, values from a are copied to each corresponding active element in res.

If the element is not located to the left of the key element position in the result vector, processor 102 determines if the element in the result vector is at the key element position in the result vector (step 608). If so, processor 102 generates a shifted base value that is equal to the base value shifted by a number of bit positions equal to the value in the key element position of the second input vector (step 610). Processor 102 then adds 1 to the shifted base value when a predetermined condition is met (step 612). As described above, in some embodiments, the predetermined condition occurs when the shifted base value does not match a result of dividing the base value by 2 raised to a power equal to the sum of values. In some embodiments, the predetermined condition can be detected when the base value is negative and any of N least-significant bits in the base value before shifting the base value are non-zero, where N is equal to the value in the key element position of the second input vector. Processor 102 then sets the element of the result vector equal to the shifted base value (step 614). For example, assuming a, b, pred, and cv contain the values shown, res could be generated as follows:

```
a    = { 7  3  -8  9  8  5  8  9 }
pred = { 0  1   1  1  1  1  1  1 }
cv   = { 0  0   1  1  1  0  0  0 }
b    = { 2  1   1  1  1  1  2  1 }
res  = { X  X  -4  X  X  X  X  X }
```

As this example shows, the key element in the second input vector contains a value of 1. Processor 102 therefore generates a shifted base value of −4, which is −8 right-shifted 1 bit position. Because the predetermined condition is not met (−4 is equal to −8 divided by 2), 1 is not added to the shifted base value, and the shifted base value is written to the key element of the result vector. Recall that a key element position may not exist (i.e., there may be no element position where both pred and cv contain non-zero values). In this case, each active element in the result vector is set equal to the corresponding element in the first input vector, as is described above with respect to steps 604-606.

If the element in the result vector is not in the key element position (step 608) (and hence is located to the right of the key element position), processor 102 generates a shifted base value that is equal to the base value shifted by a number of bit positions equal to a sum of the values in relevant elements of the second input vector from an element at the key element position to and including an element at a same position in the second input vector as the element in the result vector (step 616). As described above, in some embodiments, a relevant element is an active element in the second input vector for which a corresponding element in the control vector is active. Processor 102 then adds 1 to the shifted base value when a predetermined condition is met (step 612). As described above, in some embodiments, the predetermined condition occurs when the shifted base value does not match a result of dividing the base value by 2 raised to a power equal to the sum of values. In some embodiments, the predetermined condition can be detected when the base value is negative and any of N least-significant bits in the base value before shifting the base value are non-zero, where N is equal to the above-described sum of values. Processor 102 then sets the element of the result vector equal to the shifted base value (step 614). For example, assuming a, b, pred, and cv contain the values shown, res could be generated as follows:

```
a    = { 7  3  -8  9  8  5  8  9 }
pred = { 0  1   1  1  1  1  1  1 }
cv   = { 0  0   1  1  1  1  0  0 }
b    = { 2  1   1  1  1  1  2  1 }
res  = { X  X   X -2 -1  0  0  0 }
```

As this example shows, the active elements in res to the right of the key element position are the fourth through the eighth elements. For the fourth element of the result vector, there are two relevant elements in the second input vector from an element at the key element position to and including an element at the fourth element in the second input vector (i.e., the third and fourth elements), and the sum of the values in the relevant element is 2. Processor 102 therefore generates a shifted base value of −2, which is −8 right-shifted 2 bit positions. Because the predetermined condition is not met (−2 is equal to −8 divided by 4), 1 is not added to the shifted base value, and the fourth element of the result vector is set to the shifted base value (of −2).

For the seventh element, there are four relevant elements in the second input vector from an element at the key element position to and including the seventh element in the second input vector and the sum of the values in the relevant elements is 4. Processor 102 therefore generates a shifted base value of −1, which is −8 right-shifted four bit positions. However, because the predetermined condition is met (−1 is not equal to −8 divided by 16), 1 is added to the shifted base value, which causes the shifted base value to be equal to 0. Processor 102 then sets the seventh element of the result vector to the shifted and corrected base value (of 0). By correcting the shifted base value in this way, processor 102 avoids incorrectly computing the division using a shift operation where 1s are shifted into the negative number.

The foregoing descriptions have been presented only for purposes of illustration and description. They are not intended to be exhaustive or to limit the described embodiments to the forms disclosed. Accordingly, many modifications and variations will be apparent to practitioners skilled in the art. Additionally, the above disclosure is not intended to limit the described embodiments. The scope of these embodiments is defined by the appended claims.

What is claimed is:

1. A method for generating a result vector, comprising:
    receiving a first input vector, a second input vector, a control vector, and a predicate vector, wherein each vector includes a same number of elements, and wherein the predicate vector identifies which elements of the vectors are active elements;
    recording a base value from an element at a key element position in the first input vector, wherein the key element position is a leftmost element position of element positions for which both the control vector and the predicate vector are active; and
    generating the result vector, wherein generating the result vector comprises, for each active element in the result vector to the right of the key element position:
        generating a shifted base value that is equal to the base value shifted by a number of bit positions equal to a sum of relevant elements of the second input vector from the key element position to and including a predetermined element position in the second input vector, wherein a relevant element is an element for which a corresponding element in the control vector is active;
        correcting the shifted base value by adding 1 to the shifted base value when a first predetermined condition is met;
        setting the active element of the result vector equal to the shifted base value when the first predetermined condition is not met; and
        setting the active element of the result vector equal to the corrected, shifted base value when the first predetermined condition is met.

2. The method of claim 1, wherein the first predetermined condition is met when:
    the base value is negative; and
    any of N least-significant bits in the base value before shifting the base value are non-zero, where N is equal to the sum of relevant elements of the second input vector from the key element position to and including a predetermined element position in the second input vector.

3. The method of claim 1, wherein the first predetermined condition is met when:
    the shifted base value does not match a result of dividing the base value by 2 raised to a power equal to the sum of relevant elements of the second input vector from the key element position to and including a predetermined element position in the second input vector.

4. The method of claim 1, wherein a predetermined element from the predetermined element position in the second input vector is one of:
    a first element in the second input vector in a closest element position to the left of a given element position corresponding to the active element in the result vector; or
    an element in the second input vector at a same position as the active element in the result vector.

5. The method of claim 1, wherein generating the result vector comprises setting the element in the result vector at the key element position equal to one of:
    the base value; or
    a first value that is computed by:
        generating a shifted value equal to the base value shifted by a number of bit positions equal to the element at the key element position in the second input vector; and
        correcting the shifted value by adding 1 to the shifted value when the shifted value does not match a result of dividing the base value by 2 raised to a power equal to the element at the key element position in the second input vector, wherein the shifted value or the corrected shifted value is the first value dependent on whether or not the shifted value matches a result of dividing the base value by 2 raised to a power equal to the element at the key element position in the second input vector.

6. The method of claim 1, wherein generating the result vector comprises setting each active element in the result vector in an element position to the left of the key element position equal to a respective active element in the first input vector in the element position to the left of the key element position; and
    wherein, if no key element position exists, generating the result vector comprises setting each active element equal to a value in a corresponding element position in the first input vector.

7. The method of claim 1, wherein generating the result vector comprises leaving each inactive element in the result vector unmodified.

8. The method of claim 1, wherein the method further comprises:
    receiving a scalar shift value; and
    generating the second input vector by, for each active element in the second input vector in an element position to the right of the key element position, writing the scalar shift value as the active element of the second input vector.

9. A processor for generating a result vector, comprising:
    an execution unit configured to:
    receive a first input vector, a second input vector, a control vector, and a predicate vector, wherein each vector includes a same number of elements, and wherein the predicate vector identifies which elements of the vectors are active elements;

record a base value from an element at a key element position in the first input vector, wherein the key element position is a leftmost element position of element positions for which both the control vector and the predicate vector are active; and generate the result vector, wherein generating the result vector comprises, for each active element in the result vector to the right of the key element position:

generating a shifted base value that is equal to the base value shifted by a number of bit positions equal to a sum of relevant elements of the second input vector from the key element position to and including a predetermined element position in the second input vector, wherein a relevant element is an element for which a corresponding element in the control vector is active;

correcting the shifted base value by adding 1 to the shifted base value when a first predetermined condition is met;

setting the active element of the result vector equal to the shifted base value when the first predetermined condition is not met; and setting the active element of the result vector equal to the corrected, shifted base value when the first predetermined condition is met.

10. The processor of claim 9, wherein the first predetermined condition is met when:

the base value is negative; and any of N least-significant bits in the base value before shifting the base value are non-zero, where N is equal to the sum of relevant elements of the second input vector from the key element position to and including a predetermined element position in the second input vector.

11. The processor of claim 9, wherein the first predetermined condition is met when:

the shifted base value does not match a result of dividing the base value by 2 raised to a power equal to the sum of relevant elements of the second input vector from the key element position to and including a predetermined element position in the second input vector.

12. The processor of claim 9, wherein a predetermined element in the predetermined element position in the second input vector is one of:

a first element in the second input vector in a closest element position to the left of a given element position corresponding to the active element in the result vector; or an element in the second input vector at a same position as the active element in the result vector.

13. The processor of claim 9, wherein, when generating the result vector, the execution unit is configured to set the element in the result vector at the key element position equal to one of:

the base value; or a first value that is computed by:

generating a shifted value equal to the base value shifted by a number of bit positions equal to the element at the key element position in the second input vector; and correcting the shifted value by adding 1 to the shifted value when the shifted value does not match a result of dividing the base value by 2 raised to a power equal to the element at the key element position in the second input vector, wherein the shifted value or the corrected shifted value is the first value dependent on whether or not the shifted value matches a result of dividing the base value by 2 raised to a power equal to the element at the key element position in the second input vector.

14. The processor of claim 9, wherein the execution unit is configured to set each active element in the result vector in an element position to the left of the key element position equal to a respective active element in the first input vector for each active element in the result vector in the element position to the left of the key element position;

wherein, if no key element position exists, when generating the result vector, the execution unit is configured to set each active element equal to a value in a corresponding element position in the first input vector.

15. The processor of claim 9, wherein, when generating the result vector, the execution unit is configured to leave each inactive element in the result vector unmodified.

16. The processor of claim 9, wherein the execution unit is configured to:

receive a scalar shift value; and generate the second input vector by, for each active element in the second input vector in an element position to the right of the key element position, writing the scalar shift value as the active element of the second input vector.

17. A computer system that generates a result vector, comprising:

a processor;

a memory coupled to the processor, the memory configured to store instructions and data for the processor;

an execution unit in the processor configured to:

receive a first input vector, a second input vector, a control vector, and a predicate vector, wherein each vector includes a same number of elements, and wherein the predicate vector identifies which elements of the vectors are active elements;

record a base value from an element at a key element position in the first input vector, wherein the key element position is a leftmost element position of element positions for which both the control vector and the predicate vector are active; and generate the result vector, wherein generating the result vector comprises, for each active element in the result vector to the right of the key element position:

generating a shifted base value that is equal to the base value shifted by a number of bit positions equal to a sum of relevant elements of the second input vector from the key element position to and including a predetermined element position in the second input vector, wherein a relevant element is an element for which a corresponding element in the control vector is active;

correcting the shifted base value by adding 1 to the shifted base value when a first predetermined condition is met;

setting the active element of the result vector equal to the shifted base value when the first predetermined condition is not met; and setting the active element of the result vector equal to the corrected, shifted base value when the first predetermined condition is met.

18. The computer system of claim 17, wherein the first predetermined condition is met when:

the base value is negative; and any of N least-significant bits in the base value before shifting the base value are non-zero, where N is equal to the sum of relevant elements of the second input vector from the key element position to and including a predetermined element position in the second input vector.

19. The computer system of claim 17, wherein the first predetermined condition is met when:
the shifted base value does not match a result of dividing the base value by 2 raised to a power equal to the sum of relevant elements of the second input vector from the key element position to and including a predetermined element position in the second input vector.

20. The computer system of claim 17, wherein a predetermined element in the predetermined element position in the second input vector is one of:
a first element in the second input vector in a closest element position to the left of a given element position corresponding to the active element in the result vector; or
an element in the second input vector at a same position as the active element in the result vector.

21. The computer system of claim 17, wherein, when generating the result vector, the execution unit is configured to set the element in the result vector at the key element position equal to one of:
the base value; or
a first value that is computed by:
generating a shifted value equal to the base value shifted by a number of bit positions equal to the element at the key element position in the second input vector; and
correcting the shifted value by adding 1 to the shifted value when the shifted value does not match a result of dividing the base value by 2 raised to a power equal to the element at the key element position in the second input vector, wherein the shifted value or the corrected shifted value is the first value dependent on whether or not the shifted value matches a result of dividing the base value by 2 raised to a power equal to the element at the key element position in the second input vector.

22. The computer system of claim 17, wherein the execution unit is configured to set each active element in the result vector in an element position to the left of the key element position equal to a respective active element in the first input vector for each active element in the result vector in the element position to the left of the key element position;
wherein, if no key element position exists, when generating the result vector, the execution unit is configured to set each active element equal to a value in a corresponding element position in the first input vector.

23. The computer system of claim 17, wherein, when generating the result vector, the execution unit is configured to leave each inactive element in the result vector unmodified.

24. The computer system of claim 17, wherein the execution unit is configured to:
receive a scalar shift value; and
generate the second input vector by, for each active element in the second input vector in an element position to the right of the key element position, writing the scalar shift value as the active element of the second input vector.

\* \* \* \* \*